United States Patent
Tanigawa et al.

(10) Patent No.: US 7,062,136 B2
(45) Date of Patent: Jun. 13, 2006

(54) OPTICAL FIBER AND OPTICAL TRANSMISSION PATH

(75) Inventors: Shoji Tanigawa, Sakura (JP); Shoichiro Matsuo, Sakura (JP); Kuniharu Himeno, Sakura (JP); Koichi Harada, Sakura (JP)

(73) Assignee: Fujikura Ltd., Tokyo (JP)

( * ) Notice: Subject to any disclaimer, the term of this patent is extended or adjusted under 35 U.S.C. 154(b) by 265 days.

(21) Appl. No.: 10/440,263

(22) Filed: May 19, 2003

(65) Prior Publication Data

US 2003/0215202 A1 Nov. 20, 2003

(30) Foreign Application Priority Data

May 17, 2002 (JP) ............................. 2002-143345

(51) Int. Cl.
*G02B 6/22* (2006.01)

(52) U.S. Cl. ..................... 385/123; 385/124; 385/127

(58) Field of Classification Search ................. 385/123
See application file for complete search history.

(56) References Cited

U.S. PATENT DOCUMENTS

| | | | |
|---|---|---|---|
| 4,358,181 A | | 11/1982 | Gulati et al. |
| 5,613,027 A | | 3/1997 | Bhagavatula |
| 6,229,946 B1 | * | 5/2001 | Sasaoka et al. ............. 385/123 |
| RE38,086 E | * | 4/2003 | Onishi et al. ............... 385/123 |
| 6,801,698 B1 | * | 10/2004 | King et al. ................. 385/123 |
| 2002/0057880 A1 | | 5/2002 | Hirano et al. |
| 2003/0099455 A1 | * | 5/2003 | Zhang et al. ............... 385/142 |

FOREIGN PATENT DOCUMENTS

| EP | 0 795 521 A1 | 9/1997 |
|---|---|---|
| WO | WO 01/98804 A1 | 12/2001 |

OTHER PUBLICATIONS

Katsusuke Tajima et al., C-3-79 "Reduction of polarization-mode dispersion by high precision geometrical parameters" The Institute of Electronics, Information and Communication Engineers, Society Conference, 1999.
A.J. Barlow et al., "Birefringence and polarization mode-dispersion in spun single-mode fibers" Applied Optics, vol. 20, No. 17, p. 2962, Sep. 1981.

(Continued)

*Primary Examiner*—John R. Lee
*Assistant Examiner*—Phillip A Johnston
(74) *Attorney, Agent, or Firm*—Sughrue Mion, PLLC

(57) ABSTRACT

Under condition that a non-circularity ratio is 5% or lower and a thermal expansion coefficient of a glass which forms the core is $\alpha 1$ and a thermal expansion of a glass which forms the cladding is $\alpha 2$, the difference of coefficients is controlled such that a formula $-2.5 \times 10^{-7}/°C. \leq \alpha 1 - \alpha 2 \leq 1.0 \times 10^{-7}/°C.$ is satisfied so as to maintain a polarization mode dispersion to be 0.03 ps/km$^{0.5}$ or lower. The difference of coefficients is further controlled such that a formula $-1.5 \times 10^{-7}/°C. \leq \alpha 1 - \alpha 2 \leq 0/°C.$ is satisfied so as to maintain a polarization mode dispersion to be 0.015 ps/km$^{0.5}$ or lower. By doing this, birefringence is reduced by adjusting the thermal expansion coefficient in a core and a cladding; thus providing an optical fiber, and an optical transmission path using the optical fiber, having preferable PMD for high speed transmission.

36 Claims, 5 Drawing Sheets

OTHER PUBLICATIONS

Jun-ichi Sakai et al. "Birefringence Caused by Thermal Stress in Elliptically Deformed Core Optical Fibers" IEEE Journal of Quantum Electronics, vol. QE-18, No. 11, Nov. 1982.

Ivan P. Kaminow et al., "Optical Fiber Telecommunications III", vol. A, pp. 114 to 161.

Refractive-Index Dispersion for $GeO_2$-, $P_2O_5$- and $B_2O_3$-Doped Silica Glasses in Optical Fibers Noriyoshi Shibata and Takao Edahiro, The Transactions of the IECE of Japan, vol. E 65, No. 3, Mar. 1982.

Refractive-Index and Density of Fluorine Doped Silica Prepared by the PCVD Process, H. Wehr and D. Wiechert, Mater. Res. Bull, vol. 21 pp. 559-556 (1986).

* cited by examiner

OPTICAL FIBER AND OPTICAL TRANSMISSION PATH

BACKGROUND OF THE INVENTION

This application is based on and claims priority under 35 U.S.C. §119 with respect to Japanese Patent Application 2002-143345, filed on May 17, 2002, the entire content of which is incorporated herein by reference.

FIELD OF THE INVENTION

The present invention relates to an optical fiber. In particular, the present invention relates to an optical fiber in which a polarization mode dispersion (hereinafter called PMD) is reduced.

DESCRIPTION OF RELATED ART

Data traffic transmitted via the Internet continues to increase. Thus, it is necessary to increase communication transmission capacity so as to support the data traffic increase. Wavelength Division Multiplexing (hereinafter called WDM) transmission can satisfies such a requirement. WDM transmission has already been commercially realized. In order to increase capacity of a WDM transmission, the following methods would be potential solutions.

First, it is possible to increase the WDM transmission capacity by increasing multiplexing channels. It is possible to increase multiplexing channels by shortening the channel intervals or by increasing the wavelength bandwidth which can be used. However, according to this method, transmission apparatuses increase according to increasing the number of channels which are used; thus, this method has a disadvantage from the points of view in product cost and installation space.

Second, it is possible to increase the WDM transmission capacity by increasing the transmission speed per a channel. This method has become more common from a spectrum efficiency point of view recently. Presently, optical transmission systems having the transmission speed 2.5 Gbit/s to 10 Gbit/s, or even 40 Gbit/s, are developed. Some of them are already commercially realized.

If the transmission speed is faster than 10 Gbit/s, the chromatic dispersion and PMD of an optical fiber would become the limitations for the quality of transmission. One of the attempts to solve a problem in the chromatic dispersion is using a non-zero dispersion shifted fiber (hereinafter called a NZ-DSF) or using a slope-compensating dispersion compensating fiber (hereinafter called a SC-DCF). It is understood that such attempts have realized a certain technical achievement.

Alternatively, various methods are suggested for solving problems caused by the PMD. Here, at first, the PMD is explained.

PMD is caused because there is a differential group delay between an $HE_x^{11}$ mode and an $HE_y^{11}$ mode.

The PMD is mainly caused by a birefringence which is induced in an optical fiber, although there are other factors such as a side pressure. The birefringence which exists in an optical fiber is caused by a non-circularity of a core region in an optical fiber unless some intentional treatments are done to the optical fiber, such as in the case of a polarization maintaining fiber. The birefringence can be categorized into two types. One type of the birefringence is caused by a non-circularity of a core; in other words, a non-circularity of a refractive index profile. The other type of the birefringence is caused by a distortion from a true roundness of a residual stress which is caused by a non-circularity of the structure.

Usually, $GeO_2$ is doped into a core region of the optical fiber; therefore, the refractive index of the core is higher than the refractive index in a cladding, and, therefore, a thermal expansion coefficient in a core region is higher than that in a cladding region. Since the thermal expansion coefficient in a core region is higher than that in a cladding region; the core contracts more than the cladding contracts in a cooling process after a drawing process; therefore, the core is drawn by the cladding; thus, a tension occurs there. As a result, a tensile stress is formed near a boundary of a core and a cladding.

In contrast, a stress in a circular direction in the cladding becomes a compressive stress because the core contracts; therefore, the refractive index changes because of a photo-elastic effect.

Under condition that a core is a complete round, the refractive index change due to the photo-elastic effect is axially symmetrical; therefore, any difference of a propagation constant between the $HE_x^{11}$ mode and the $HE_y^{11}$ mode is not induced. On the other hand, if a core is not a complete round, there occurs a difference of a propagation constant between the $HE_x^{11}$ mode and the $HE_y^{11}$ mode. The magnitude of the difference of a propagation constant which is caused by an asymmetry in the stress depends on the magnitude of both differences of the thermal expansion coefficients between in the core and the cladding, and non-circularity of the core.

When a signal is transmitted, an anisotropy in a progression of a signal occurs if the birefringence exists. Therefore, the shape of the signal pulse is degraded. This is the reason why it is certainly preferable that PMD be as small as possible. In particular, PMD has a remarkably significant effect in a high speed transmission such as 40 Gbit/s or more.

In order to reduce the PMD, there have been several proposals. For example, in first method, a fiber is twisted in a drawing process (Applied Optics, Vol. 20, No. 17, page 2962 (1981)). In second method, a non-circular of a core is made small by re-shaping from thereoutside (The Institute of Electronics, Information and Communication Engineers, Society Conference 1999, C-3-77 (1999)).

However, according to the first method, in which a fiber is twisted in a drawing process, it is not disclosed how to produce an optical fiber having a PMD which can deal with a high transmission speed such as 10 Gbit/s or 40 Gbit/s. For example, in an optical transmission path for 40 Gbit/s of transmission speed and 10,000 km of transmission distance, it is said that allowable upper limit for PMD is 0.025 $ps/km^{0.5}$.

Also, the second method in which a non-circular in a core is reshaped from outside of the cladding is not realistic from a product cost point of view. Furthermore, it may be possible to use a core having a very small non-circularity, however, this idea is not realistic from a product yield point of view; that is, from a product cost point of view.

SUMMARY OF THE INVENTION

The present invention was made in consideration of the above problems. An object of the present invention is to provide an optical fiber having a PMD suitable for a high speed transmission by reducing the occurrence of birefringence by adjusting both thermal expansion coefficients in the core and the cladding. Also, another object of the present invention is to provide an optical transmission path using the above optical fiber.

In order to solve the above problems, the present invention may be an optical fiber which is made mainly from a silica glass having a layer of core and a layer of cladding in which a formula such as $-2.5\times10^{-7}/°$ C.$\leq\alpha1-\alpha2\leq1.0\times10^{-7}/°$ C. is satisfied, and a polarization mode dispersion is 0.03 ps/km$^{0.5}$ or lower. Here, $\alpha1$ is the thermal expansion coefficient of glass which forms the core and $\alpha2$ is the thermal expansion coefficient of glass which forms the cladding.

By doing this and using this fiber, it is possible to prevent a degradation of a shape of the signal pulse due to the birefringence; thus, it is possible to realize a high speed and a high quality transmission.

Also, the present invention may be an optical fiber which is made mainly from a silica glass having a layer of core and a layer of cladding in which a formula such as $-1.5\times10^{-7}/°$ C.$\leq\alpha1-\alpha2\leq0/°$ C. is satisfied, and a polarization mode dispersion is 0.015 ps/km$^{0.5}$ or lower Here, $\alpha1$ is the thermal expansion coefficient of glass which forms the core and $\alpha2$ is the thermal expansion coefficient of glass which forms the cladding.

By doing this and using this fiber, it is possible to further prevent a degradation of a shape of the signal pulse due to the birefringence; thus, it is possible to realize a higher speed and a higher quality transmission.

Also, the present invention may be an optical fiber in which the cladding is a silica glass member to which at least a fluorine is doped, the core is an approximately pure silica glass member, or the core is a silica glass member of which core is doped with a germanium and/or a fluorine, and a transmission loss at a wavelength of 1550 nm is 0.20 dB/km or lower.

By selecting the above elements for a dopant for adjusting the thermal expansion coefficient, more flexible design for the refractive index profile is available. Also, these elements are dopants having lower loss; therefore, it is possible to realize an optical fiber in which a requirement for transmission loss, optical characteristics, and hydrogen characteristics are satisfied and PMD is preferably under the tolerable level.

In the present invention, it may be acceptable that a germanium together with a fluorine is doped into the cladding so as to improve hydrogen characteristics.

By doing this, it is possible to realize more preferable hydrogen characteristics than those in a case in which a germanium is not doped into the cladding. Therefore, it is possible to realize a reliable optical fiber over an entire product life.

Also, the present invention may be an optical fiber which is made mainly from a silica glass member, and having a layer of core and two layers of cladding with a refractive index in an outer cladding higher than a refractive index in an internal cladding in which a formula such as $-2.5\times10^{-7}/°$ C.$\leq\alpha1-\alpha2\leq1.0\times10^{-7}/°$ C. is satisfied, and a polarization mode dispersion is 0.03 ps/km$^{0.5}$ or lower. Here, $\alpha1$ is the thermal expansion coefficient of glass which forms the core and $\alpha2$ is the thermal expansion coefficient of glass which forms a part having the lowest thermal expansion coefficient in the cladding.

By doing this and using this fiber, it is possible to prevent a degradation of a shape of the signal pulse due to the birefringence; thus, it is possible to realize a high speed and high quality transmission.

The present invention may be an optical fiber which is made mainly from a silica glass member and has a layer of core and two layers of cladding and has refractive index in an outer cladding than the refractive index in an internal cladding in which a formula such as $-1.5\times10^{-7}/°$ C.$\leq\alpha1-\alpha2\leq0/°$ C. is satisfied, and a polarization mode dispersion is 0.015 ps/km$^{0.5}$ or lower. Here, $\alpha1$ is the thermal expansion coefficient of glass which forms the core and $\alpha2$ is the thermal expansion coefficient of glass which forms a part having the lowest thermal expansion coefficient in the cladding.

By doing this and using this fiber, it is possible to further prevent a degradation of a shape of the signal pulse due to the birefringence; thus, it is possible to realize a higher speed and higher quality transmission.

The present invention may be an optical fiber in which the cladding is a silica glass member to which at least a fluorine is doped, the core is an approximately pure silica glass member, or the core is a silica glass member of which core is doped with a germanium and/or a fluorine, and a transmission loss at a wavelength of 1550 nm is 0.22 dB/km or lower.

By selecting the above elements for a dopant for adjusting the thermal expansion coefficient, more flexible design for the refractive index profile is available. Also, these elements are dopants having lower loss; therefore, it is possible to realize an optical fiber in which a requirement for transmission loss, optical characteristics, and hydrogen characteristics are satisfied and PMD is preferably under the tolerable level sufficiently.

The present invention may be an optical fiber wherein a germanium together with a fluorine is doped into any one of the cladding or all of the claddings so as to improve hydrogen characteristics.

By doing this, it is possible to realize more preferable hydrogen characteristics than those in a case in which a germanium is not doped into the cladding. Therefore, it is possible to realize a reliable optical fiber over an entire product life.

The present invention may be an optical fiber which is made mainly from a silica glass member having three layers of core and two layers of cladding with a refractive index in an outer cladding equal to or greater than a refractive index in an internal cladding, and a refractive index in a central core higher than a refractive index in a ring groove, and a refractive index in the ring groove lower than a refractive index in a ring core and a refractive index in the ring core higher than a refractive index in the claddings or than refractive indexes in the in the internal cladding and the outer cladding in which a formula such as $-2.5\times10^{-7}/°$ C.$\leq\alpha1-\alpha2\leq1.0\times10^{-7}/°$ C. is satisfied, and a polarization mode dispersion is 0.03 ps/km$^{0.5}$ or lower. Here, $\alpha1$ is the thermal expansion coefficient of glass which forms the part of the core having the highest thermal expansion coefficient and $\alpha2$ is the thermal expansion coefficient of glass which forms a part having the lowest thermal expansion coefficient in the cladding.

By doing this and using this fiber, it is possible to prevent a degradation of a shape of the signal pulse due to the birefringence; thus, it is possible to realize a high speed and high quality transmission.

The present invention may be an optical fiber which is made mainly from a silica glass member having three layers of core and two layers of cladding with a refractive index in an outer cladding equal to or greater than a refractive index in an internal cladding and a refractive index in a central core higher than a refractive index in a ring groove and a refractive index in the ring groove lower than a refractive index in a ring core and a refractive index in the ring core higher than a refractive index in the claddings or than refractive indexes in the in the internal cladding and the outer cladding in which a formula such as $-1.5 \times 10^{-7}/°C. \leq \alpha1-\alpha2 \leq 0/°C.$ is satisfied and a polarization mode dispersion is 0.015 ps/km$^{0.5}$ or lower. Here, $\alpha1$ is the thermal expansion coefficient of glass which forms the part of the core having the highest thermal expansion coefficient and $\alpha2$ is the thermal expansion coefficient of glass which forms a part having the lowest thermal expansion coefficient in the cladding.

By doing this and using this fiber, it is possible to prevent a degradation of a shape of the signal pulse due to the birefringence; thus, it is possible to realize a higher speed and higher quality transmission.

The present invention may be an optical fiber in which the cladding is a silica glass member to which at least a fluorine is doped, the every parts of the core consist an approximately pure silica glass member, and/or a silica glass member of which is doped with a germanium and/or a fluorine, and a transmission loss at a wavelength of 1550 nm is 0.25 dB/km or lower.

By selecting the above elements for a dopant for adjusting the thermal expansion coefficient, more flexible design for refractive index profile is available. Also, these elements are dopants having lower loss; therefore, it is possible to realize an optical fiber in which a requirement for transmission loss, optical characteristics, and hydrogen characteristics are satisfied and PMD is preferably under the tolerable level sufficiently.

The present invention may be an optical fiber in which a germanium together with a fluorine is doped into any one of the cladding or all of the claddings so as to improve hydrogen characteristics.

By doing this, it is possible to realize more preferable hydrogen characteristics than those in a case in which a germanium is not doped into the cladding. Therefore, it is possible to realize a reliable optical fiber over an entire product life.

The present invention may be an optical fiber which is made mainly from a silica glass member having four layers of core and two layers of cladding with a refractive index in an outer cladding equal to or greater than a refractive index in an internal cladding and a refractive index in a central groove lower than a refractive index in an internal ring core and a refractive index in the internal ring core higher than a refractive index in the ring groove and a refractive index in the ring groove lower than a refractive index in the outer ring core, and a refractive index in the outer ring core higher than a refractive index in the claddings or than refractive indexes in the internal cladding and the outer cladding in which a formula such as $-2.5 \times 10^{-7}/°C. \leq \alpha1-\alpha2 \leq 1.0 \times 10^{-7}/°C.$ is satisfied; and a polarization mode dispersion is 0.03 ps/km$^{0.5}$ or lower Here, $\alpha1$ is the thermal expansion coefficient of glass which forms the part of the core having the highest thermal expansion coefficient and $\alpha2$ is the thermal expansion coefficient of glass which forms a part having the lowest thermal expansion coefficient in the cladding.

By doing this and using this fiber, it is possible to prevent a degradation of a shape of the signal pulse due to the birefringence; thus, it is possible to realize a high speed and high quality transmission.

The present invention may be an optical fiber which is made mainly from a silica glass member having four layers of core and two layers of cladding with a refractive index in an outer cladding equal to or greater than a refractive index in an internal cladding and a refractive index in a central groove lower than a refractive index in an internal ring core and a refractive index in the internal ring core higher than a refractive index in the ring groove and a refractive index in the ring groove lower than a refractive index in the outer ring core, and a refractive index in the outer ring core higher than a refractive index in the claddings or than refractive indexes in the internal cladding and the outer cladding in which a formula such as $-1.5 \times 10^{-7}/°C. \leq \alpha1-\alpha2 \leq 0/°C.$ is satisfied, and a polarization mode dispersion is 0.015 ps/km$^{0.5}$ or lower Here, $\alpha1$ is the thermal expansion coefficient of glass which forms the part of the core having the highest thermal expansion coefficient and $\alpha2$ is the thermal expansion coefficient of glass which forms a part having the lowest thermal expansion coefficient in the cladding.

By doing this and using this fiber, it is possible further to prevent a degradation of a shape of the signal pulse due to the birefringence; thus, it is possible to realize a higher speed and higher quality transmission.

The present invention may be an optical fiber in which the cladding is a silica glass member to which at least a fluorine is doped, the every parts of core consist an approximately pure silica glass member, and/or a silica glass member of which is doped with a germanium and/or a fluorine, and a transmission loss at a wavelength of 1550 nm is 0.30 dB/km or lower.

By selecting the above elements for a dopant for adjusting the thermal expansion coefficient, more flexible design for the refractive index profile is available. Also, these elements are dopants having lower loss; therefore, it is possible to realize an optical fiber in which a requirement for transmission loss, optical characteristics, and hydrogen characteristics are satisfied and PMD is preferably under the tolerable level sufficiently.

The present invention may be an optical fiber in which a germanium together with a fluorine is doped into any one of the cladding or all of the claddings so as to improve hydrogen characteristics.

By doing this, it is possible to realize more preferable hydrogen characteristics than those in a case in which a germanium is not doped into the cladding. Therefore, it is possible to realize a reliable optical fiber over an entire product life.

The present invention may be an optical fiber in which a formula such as $C2-C1 \geq 0.5$ wt %. Here, C2 is the concentrations of germanium in a part of the claddings having the lowest amount of germanium and C1 is the concentrations of germanium in a part of the cores having the highest amount of germanium.

By doing this, it is possible to realize an optical fiber which satisfies both of the requirements to ease to control the refractive index and to control the coefficient of thermal expansion and PMD reduction.

The present invention may be an optical fiber according to any one of the above aspects of the present inventions in which the maximum concentration of germanium which is doped into the cores is 1.5 wt %, and the maximum concentration of fluorine which is doped into the cores is also 1.5 wt %.

By doing this, it is possible to prevent an increase in the Rayleigh scattering loss; thus, it is possible to realize an optical fiber having lower loss.

The present invention may be an optical fiber according to any one of the above aspects of the present invention in which an optical fiber preform is twisted and drawn, and a polarization mode dispersion is 0.01 ps/km$^{0.5}$ or lower.

By doing this, it is possible to reduce PMD more.

The present invention may be an optical transmission path which formed by combining the optical fiber according to any one aspect of the present invention and SCDCF (or DCF).

By doing this, it is possible to alleviate the limitation which is required for the PMD in a SCDCF (or DCF); thus flexible designing for the SCDCF (or DCF) can be realized. In addition, it is possible to decrease PMD over an entire optical transmission path; thus, it is possible to realize an optical transmission path which can realize high-speed and high quality transmission.

As explained above, according to the present invention, an optical fiber is produced by adjusting a coefficient of thermal expansion of the cladding and a coefficient of thermal expansion of the core. Also, a formula such as $-2.5 \times 10^{-7}/° C. \leqq \alpha 1 - \alpha 2 \leqq 1.0 \times 10^{-7}/° C.$ is satisfied. Here, $\alpha 1$ is the thermal expansion coefficient of glass which forms the core and $\alpha 2$ is the thermal expansion coefficient of glass which forms the cladding. Thus, a polarization mode dispersion can be 0.03 $ps/km^{0.5}$ or lower. Also, it is possible to realize an optical fiber, which can prevent the form of signal pulse from being degraded due to the birefringence; thus, it is possible to realize an optical fiber, which can be used in a high speed and high quality transmission.

Also, by producing an optical fiber so that a formula such as $-1.5 \times 10^{-7}/° C. \leqq \alpha 1 - \alpha 2 \leqq 0/° C.$ is satisfied, it is possible to realize a polarization mode dispersion such as 0.015 $ps/km^{0.5}$ or lower.

Also, by producing an optical fiber such that the core is approximately a pure silica glass member and the cladding is a silica glass member to which a fluorine is doped, it is possible to increase a thermal expansion coefficient in the cladding relatively; thus, it is possible to realize an optical fiber having a preferable (low) PMD.

Also, by producing an optical fiber such that the core is a silica glass member of which core is doped with a germanium and/or a fluorine, and the cladding is a silica glass member to which a fluorine is doped, it is possible to realize an optical fiber which can satisfy required optical characteristics, hydrogen characteristics, and PMD characteristics even if there is a refractive index profile in the core and a dopant is necessary to be in the core from a hydrogen characteristics point of view.

Also, by doping a germanium together with a fluorine to the cladding, it is possible to improve hydrogen characteristics; therefore, it is possible to realize an optical fiber having a higher reliability for an entire product life.

Also, a formula such as $C2-C1 \geqq -0.5$ wt % is satisfied under condition that C2 is the minimum concentrations of germanium which is doped into the cladding and C1 is the maximum concentrations of germanium which is doped into the core; therefore, it is possible to realize an optical fiber which can satisfy the requirements for controlling the refractive index and the thermal expansion coefficient, and PMD is reduced.

Also, the concentration of germanium which is doped into the core is 1.5 wt % or lower and the concentration of fluorine is 1.5 wt % or lower, it is possible to realize an optical fiber in which loss is reduced; thus, the Rayleigh scattering loss is small.

Also, by twisting an optical fiber preform in the drawing process, it is possible to reduce the polarization mode dispersion such as $0.01/ps/km^{0.5}$ or lower.

The above effects are not limited in an optical fiber having a layer of core and a layer of cladding. By setting the above parameters so as to be the same as the above conditions, it is possible to realize the same effects in an optical fiber having a layer of core and two layers of cladding, an optical fiber having three layers of core and one or two layer of cladding, an optical fiber having four layers of core and one or two layers of cladding.

By forming an optical transmission path by combining an optical fiber according to the present invention and an optical fiber for compensating the wavelength dispersion an the dispersion slope for the above optical fiber, it is possible to alleviate an allowable condition for PMD in a dispersion compensated optical fiber. Also, a flexible design for a dispersion compensated optical fiber is possible, and it is possible to realize an optical transmission path in which high speed and high quality transmission is possible.

DETAILED DESCRIPTION OF THE INVENTION

The present invention is explained as follows with reference to the drawings.

Figure 1A:
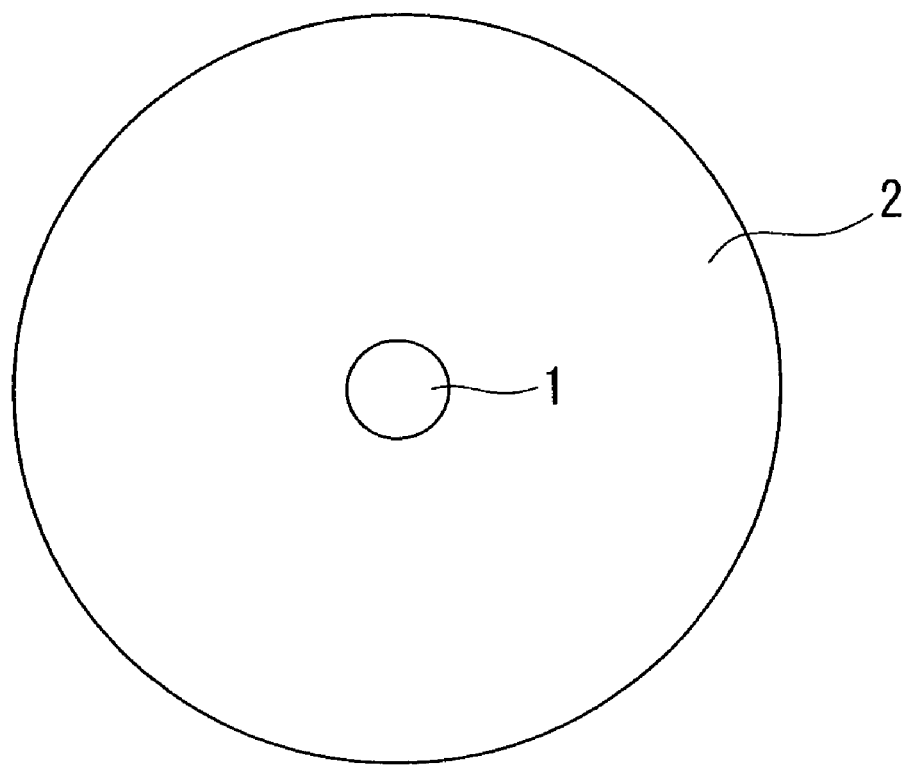
FIG. 1A is a view showing a cross section of an optical fiber in a longitudinal direction.
Figure 1B:
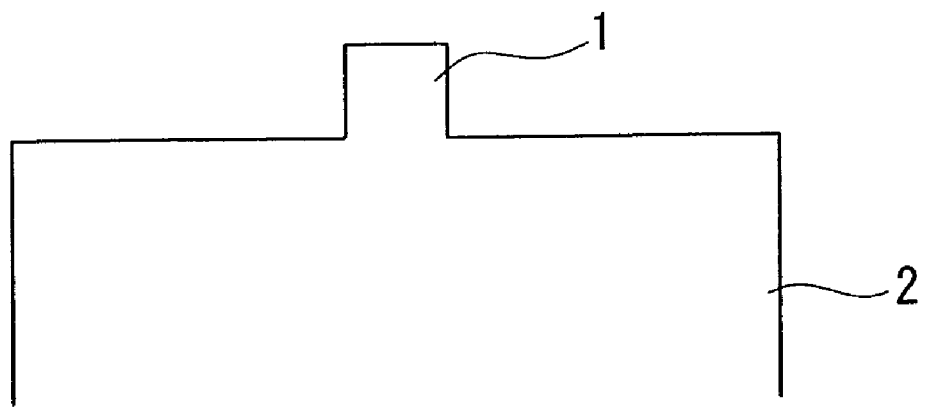
FIG. 1B is an example of a refractive index profile.

FIGS. 1A and 1B show an example of an optical fiber according to the present invention. FIG. 1A shows an example of cross section of an optical fiber in a longitudinal direction in a simplest form. In FIG. 1A, reference numeral 1 indicates a core region. Reference numeral 2 indicates a cladding region which is formed around the core 1. FIG. 1B shows a refractive index profile in the optical fiber. Here, the core 1 is formed so as to have refractive index higher than the refractive index in the cladding 2. In FIGS. 2A to 5B, other examples of cross section and refractive index profile in an optical fiber according to the present invention are shown.

As explained above, birefringence in an optical fiber is caused by a non-circularity of the refractive index distribution due to a non-circularity in the core 1. Also, birefringence is caused in an optical fiber due to a non-circularity of a residual stress. Under a condition that the refractive index difference between the core 1 and the cladding 2 in an optical fiber which is used in a transmission path, such as a relative index difference $\Delta$ is 0.25% to 0.7%, it can be said that birefringence is caused mainly due to a non-circularity of a residual stress.

Figure 7:
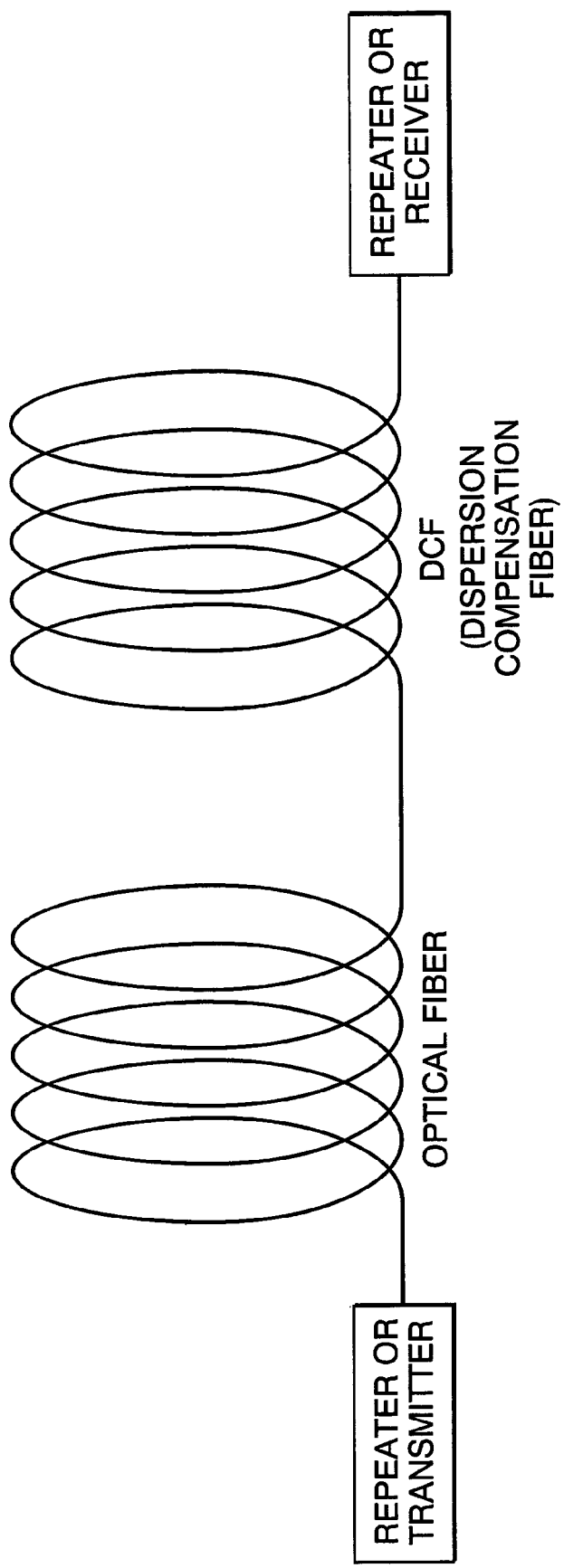
FIG. 7 shows an example for an optical transmission path which is used in the present invention.

FIG. 7 shows an example of the optical transmission path as a transmitting medium which is used for transmitting an information by making use of alight. The optical transmission path connects a transmitting device and a receiving device which convey a signal light. As a form of the optical transmission path, an optical fiber or a plurality of optical fibers which are bundled are used for that purpose. The birefringence caused by a non-circularity of a residual stress increases in proportion with a difference of a thermal expansion coefficient between a core and a cladding, if the non-circularities of a core are the same level.

In a conventional single mode fiber, which has a germanium doped core, a difference of coefficient of thermal expansions between the core 1 and the cladding 2 is indicated approximately $3 \times 10^{-7}/°$ C. under a condition that the relative index difference $\Delta$ is approximately 0.3%. In contrast, an optical fiber according to the present embodiment has a sufficiently small difference of the coefficient of thermal expansion.

Also, by orthogonalizing the direction of the birefringence which is caused by a non-circularity in the refractive index profile which is caused by a non-circularity in the core 1 and the direction of the birefringence which is caused by a non-circularity of residual stress, the PMD can be reduced. That is, the PMD can be reduced by making the thermal expansion coefficient in the cladding 2 higher than the thermal expansion coefficient in the core 1.

Based on the above theory, research and development was conducted so as to reduce the PMD. It was found that it is necessary that a formula such as $-2.5 \times 10^{-7}/°$ C.$\leq \alpha 1 - \alpha 2 \leq 1.0 \times 10^{-7}/°$ C. should be satisfied so as to realize 0.03 ps/km$^{0.5}$ or lower of polarization mode dispersion. Here, $\alpha 1$ is the thermal expansion coefficient of glass which forms the core and $\alpha 2$ is the thermal expansion coefficient of glass which forms the cladding. Also, it was found that it is necessary that a formula such as $-1.5 \times 10^{-7}/°$ C.$\leq \alpha 1 - \alpha 2 \leq 0/°$ C. should be satisfied so as to realize 0.015 ps/km$^{0.5}$ or lower polarization mode dispersion. Here, $\alpha 1$ is the thermal expansion coefficient of glass which forms the core and $\alpha 2$ is the thermal expansion coefficient of glass which forms the cladding. These conditions are realized under condition that a maximum non-circularity ratio is approximately 5% which is equivalent to the maximum non-circularity ratio in a conventional optical fiber.

Here, we use a thermal expansion coefficient within a temperature range from approximately apparent initial softening temperature to a room temperature as a thermal expansion coefficient. Here, the apparent initial softening temperature indicates an index for a condition in a glass member. The apparent initial softening temperature changes according to factors such as a forming member, dopants, concentration of dopants, and various manufacturing method and/or parameter therefor. In a silica glass member, the apparent initial softening temperature decreases when the dopants increase. For example, the apparent initial softening temperature of the silica glass member to which 1 wt % of a fluorine is doped, which was produced by the inventors of the present invention, is approximately 800° C.

Next, a method for arranging a coefficient of thermal expansions in the core 1 and the cladding 2 within the above range is explained.

Thermal expansion coefficient greatly depends on a composition of its forming member. For example, it is known that a thermal expansion coefficient increases by approximately $1 \times 10^{-7}/°$ C. in a silica glass member to which 1 wt % of germanium is doped, in comparison to a conventional silica glass member. Therefore, it is necessary to conduct a close examination for a member and its composition which forms the core 1 and the cladding 2 so as to adjust a thermal expansion coefficient. Furthermore, such a member and forming composition should be examined by taking fundamental factors for a transmission fiber such as optical characteristics, transmission loss, environmental characteristics, mechanical characteristics, and a product cost into account.

As a result of various examination, members for a core 1 and a cladding 2 and composition ratio which can satisfy the requirement for a thermal expansion coefficient in the core 1 and the cladding 2, and a fundamental factors of a transmission fiber are as follows.

A first combination is formed by an approximately pure silica glass member for a core 1 (that is, a silica glass member which does not contain impurities intentionally), and a silica glass member for a cladding 2 to which a fluorine is doped. Fluorine decreases refractive index. Also, thermal expansion coefficient increases near a fictive temperature if a fluorine is doped. Therefore, it is possible that the refractive index in the core 1 is relatively high; thus, there is no problem with regard to a waveguiding structure. Also, it is possible to produce an optical fiber having a preferable PMD by increasing the thermal expansion coefficient in the cladding relatively.

A second combination is formed by a silica glass member in which either one of a germanium or a fluorine is doped into the core 1 and a fluorine is doped into the cladding 2 by taking production efficiency, hydrogen characteristics, and optical characteristics into account. Here, it is possible to add both the germanium and the fluorine to the core 1. By doing this, it is possible to satisfy the requirement for an optical characteristics, hydrogen characteristics, and PMD sufficiently even if it is necessary to make a refractive index distribution in the core 1 according to a requirement from an optical characteristics point of view or if a dopant is necessary in the core 1 from a hydrogen characteristics point of view.

According to the above combinations, it is possible that the transmission loss in 1550 nm of wavelength be 0.20 dB/km or lower.

If a dopant is doped so as to improve hydrogen characteristics, it is no problem doping a dopant to the core 1 uniformly. However, if it is necessary to dispose a refractive index distribution in the core 1 according to a requirement from an optical characteristics point of view, it is necessary to dispose dopant concentration distribution which can satisfy such requirement of optical characteristics because the dopant affects the thermal expansion coefficient and the refractive index. Therefore, it is necessary to realize a distribution of dopant so as to satisfy the requirement for a thermal expansion coefficient and refractive index profile. However, the refractive index distribution depends on a required optical characteristics; thus, it is necessary to design a dopant distribution taking a thermal expansion coefficient into account.

Also, it is preferable to dope a germanium to the cladding 2 by taking a hydrogen characteristics for a fiber which is installed in the submarine cable in which long term reliability is necessary.

Furthermore, as to germanium, the change (increase) of thermal expansion coefficient is large when the germanium is doped into a silica glass member. Therefore, it is necessary to be careful if the germanium is doped thereinto. That is, there is a problem because a thermal expansion coefficient in the core 1 increases (compared to that of cladding), if an amount of doped germanium to the core 1 is far larger than an amount of doped germanium to the cladding 2 when the germanium is used for controlling the refractive index.

By estimating a maximum limit for a difference between an amount of germanium doped into the core 1 and an amount of germanium doped into the cladding 2 so as to realize a low PMD, it is found that a preferable PMD of 0.03 ps/km$^{0.5}$ or lower can be realized, if a formula such as C2−C1$\geq$−0.5 wt % is satisfied under condition that C2 is the concentration of germanium which is doped into the cladding 2 and C1 is the concentration of germanium which is doped into the core 1. Here, if the concentration of germanium in the core 1 is 0.5 wt % or lower, it is not necessary to dope a germanium into the cladding 2.

Furthermore, a germanium and a fluorine increases a Rayleigh scattering loss which is a primary cause of transmission loss. Therefore, it is preferable that the concentration of germanium and the concentration of fluorine are 1.5 wt % or lower so as to reduce the transmission loss.

Furthermore, it is possible to further reduce PMD by twisting an optical fiber preform in a drawing operation when an optical fiber is drawn. Specifically, it is possible to make PMD 0.01 ps/km$^{0.5}$ or lower.

Figure 6:
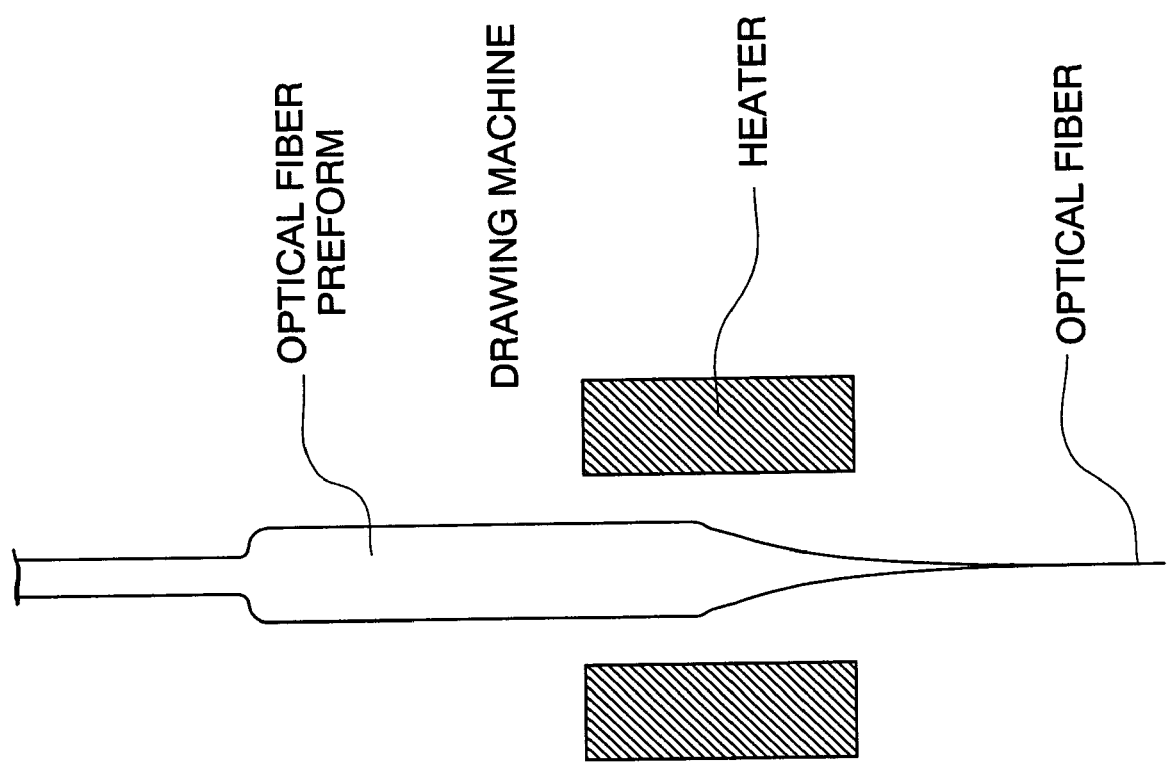
FIG. 6 shows an example for an optical fiber preform which is used in the present invention.

FIG. 6 shows an example of a preform. This preform is an intermediate product for forming an optical fiber made of a glass member in a bar shape. This preform has a relative refractive index distribution which is equivalent to that in the optical fiber. The outer diameter of the preform is, for example, a thousand times as large as that of the optical fiber. The preform is heated by heater and is drawing process; thus, an optical fiber is produced.

According to the present embodiment for an optical fiber, by adjusting a thermal expansion coefficient in the cladding 2 and a thermal expansion coefficient in the core 1, it is possible that a polarization mode dispersion is 0.03 ps/km$^{0.5}$ or lower by forming an optical fiber such that a formula such as $-2.5 \times 10^{-7}/°C. \leq \alpha 1 - \alpha 2 \leq 1.0 \times 10^{-7}/°C.$ is satisfied. Here, $\alpha 1$ is the thermal expansion coefficient of glass which forms the core and $\alpha 2$ is the thermal expansion coefficient of glass which forms the cladding. Also, it is possible to prevent degradation of signal pulse shape due to birefringence; thus, it is possible to realize a high speed and high quality transmission.

According to the present embodiment for an optical fiber, by adjusting a thermal expansion coefficient in the cladding 2 and a thermal expansion coefficient in the core 1, it is possible that a polarization mode dispersion is 0.015 ps/km$^{0.5}$ or lower by forming an optical fiber such that a formula such as $-1.5 \times 10^{-7}/°C. \leq \alpha 1 - \alpha 2 \leq 0/°C.$ is satisfied. Here, $\alpha 1$ is the thermal expansion coefficient of glass which forms the core and $\alpha 2$ is the thermal expansion coefficient of glass which forms the cladding. Also, it is possible to prevent degradation of signal pulse shape due to birefringence; thus, it is possible to realize a high speed and high quality transmission.

Also, it is possible to increase a thermal expansion coefficient in the cladding 2 relatively, by forming an optical fiber such that a core 1 is an approximately pure silica glass member and a cladding 2 is a silica glass member to which a fluorine is doped; thus, it is possible to realize an optical fiber having a preferable (low) PMD.

Also, by forming an optical fiber such that the core 1 is a silica glass member of which core is doped with a germanium and/or a fluorine, and the cladding 2 is a silica glass member to which a fluorine is doped, it is possible to realize an optical fiber in which a requirement for transmission loss, optical characteristics, and hydrogen characteristics are satisfied and PMD is preferably under the tolerable level sufficiently if there is a refractive index profile in the core 1 or a dopant is necessary in the core 1 from hydrogen characteristics point of view.

Also, it is possible to realize an optical fiber which is reliable over an entire product life because it is possible to improve hydrogen characteristics by doping a germanium together with a fluorine to the cladding 2.

Also, under condition that a formula such as $C2-C1 \geq -0.5$ wt % is satisfied under condition that C2 is the concentrations of germanium which is doped into the cladding 2 and C1 is the concentrations of germanium which is doped into the core 1, it is possible to realize an optical fiber in which a requirement for transmission loss, optical characteristics, and hydrogen characteristics are satisfied and PMD is preferably under the tolerable level.

Also, under condition that the maximum concentration of germanium which is doped into the core 1 is 1.5 wt % or lower, and the maximum concentration of fluorine which is doped into the core 1 is also 1.5 wt % or lower, it is possible to realize a low loss optical fiber by reducing the Rayleigh scattering loss.

Also, by drawing an optical fiber preform by adding twists, it is possible to reduce a polarization mode dispersion by 0.01 ps/km$^{0.5}$ or lower.

The refractive index profile in an optical fiber according to the present invention is not limited in a refractive index profile in a layer of core and a layer of cladding shown in FIGS. 1A and 1B.

Figure 2A:
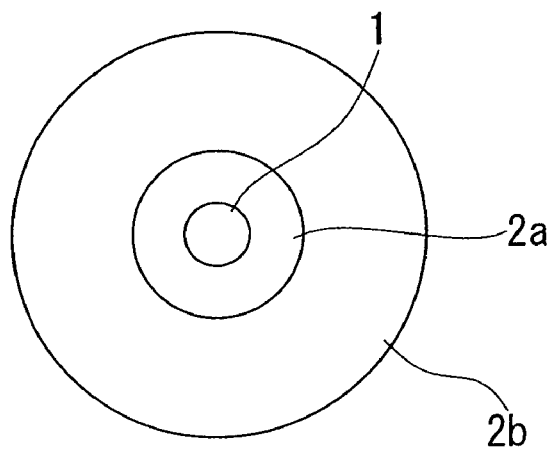
FIG. 2A is a view showing a cross section of an optical fiber in a longitudinal direction.
Figure 2B:
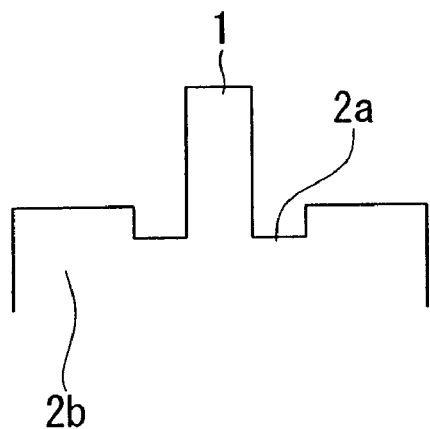
FIG. 2B is an example of a refractive index profile.

For example, FIGS. 2A and 2B show an optical fiber formed so as to have a layer of core and two layers of cladding, with a refractive index in an outer cladding 2b that is higher than a refractive index in an internal cladding 2a, in which a relationship of $\alpha 1$ and $\alpha 2$ satisfies the above relationship; here, $\alpha 1$ is the thermal expansion coefficient of glass which forms the core and $\alpha 2$ is the thermal expansion coefficient of glass which forms a part having the lowest thermal expansion coefficient in the cladding.

By forming an optical fiber such that a cladding is a silica glass member to which at least a fluorine is doped, and a core is an approximately pure silica glass member, or the core is a silica glass member of which core is doped with a germanium and/or a fluorine, it is possible to realize a transmission loss at a wavelength of 1550 nm to be 0.22 dB/km or lower.

Figure 4A:
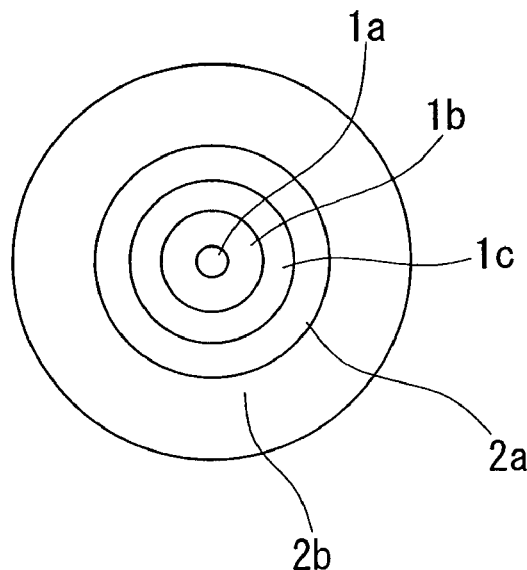
FIG. 4A is a view showing a cross section of an optical fiber in a longitudinal direction.
Figure 4B:
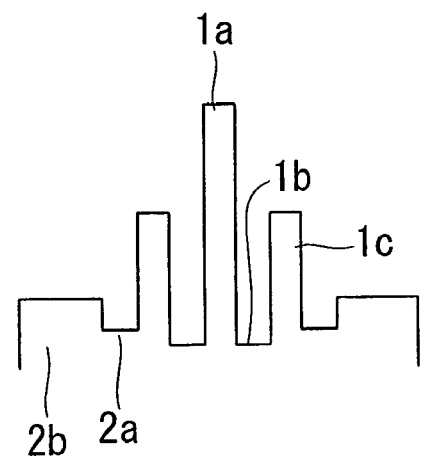
FIG. 4B is an example of a refractive index profile.

FIGS. 4A to 4B show optical fibers made mainly from a silica glass member having three layers of core and two layers of cladding with a refractive index in an outer cladding 2b equal to or greater than a refractive index in an internal cladding 2a and a refractive index in a central core 1a higher than a refractive index in a ring groove 1b and a refractive index in the ring groove 1b lower than a refractive index in a ring core 1c and a refractive index in the ring core 1c higher than a refractive index in the cladding 2 or than a refractive indexes in the in the internal cladding 2a and the outer cladding 2b. Such a case is satisfied under condition that a relationship of $\alpha 1$ and $\alpha 2$ satisfies the above relationship; here, $\alpha 1$ is the thermal expansion coefficient of glass which forms the part of the core having the highest thermal expansion coefficient and $\alpha 2$ is the thermal expansion coefficient of glass which forms a part having the lowest thermal expansion coefficient in the cladding.

In such an optical fiber, the cladding is a silica glass member to which at least a fluorine is doped, and the every part of core consists an approximately pure silica glass member, and/or a silica glass member of which core is doped with a germanium and/or a fluorine. Therefore, it is possible that a transmission loss at a wavelength of 1550 nm is 0.25 dB/km or lower.

Figure 5A:
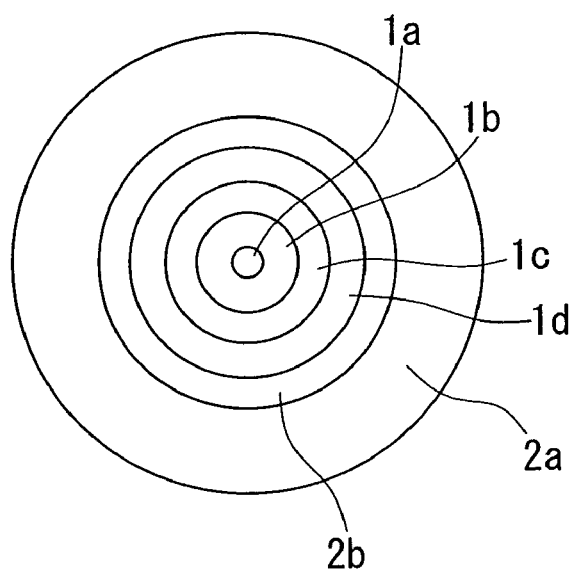
FIG. 5A is a view showing a cross section of an optical fiber in a longitudinal direction.
Figure 5B:
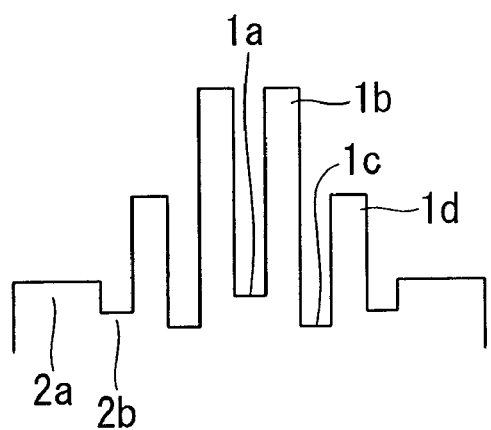
FIG. 5B is an example of a refractive index profile.

FIGS. 5A and 5B show an optical fiber made mainly from a silica glass member having four layers of core and two layers of cladding with a refractive index in an outer cladding 2b equal to or greater than a refractive index in an internal cladding 2a and a refractive index in a central groove 1a lower than a refractive index in an internal ring core 1*b* and a refractive index in the internal ring core 1*b* higher than a refractive index in the ring groove 1*c* and a refractive index in the ring groove 1*c* lower than a refractive index in the outer ring core 1*d*, and a refractive index in the outer ring core 1*d* higher than a refractive index in the cladding 2 or than refractive indexes in the internal cladding 2*a* and the outer cladding 2*b*. Such a case is satisfied under condition that a relationship of α1 and α2 satisfies the above relationship; here, α1 is the thermal expansion coefficient of glass which forms the part of the core having the highest thermal expansion coefficient and α2 is the thermal expansion coefficient of glass which forms a part having the lowest thermal expansion coefficient in the cladding.

By forming an optical fiber such that the cladding is a silica glass member to which at least a fluorine is doped and the every part of core consist an approximately pure silica glass member, and/or a silica glass member of which core is doped with a germanium and/or a fluorine, it is possible to realize a transmission loss at a wavelength of 1550 nm to be 0.30 dB/km or lower.

Next, embodiments of an optical transmission path according to the present invention is explained as follows.

An optical transmission path according to the present invention is formed by an above optical fiber and an SCDCF (or DCF)

It is possible to realize an integrated optical transmission path in which a signal distortion is reduced by using a dispersion compensated optical fiber for compensating a chromatic dispersion (and a dispersion slope) in a transmission optical fiber used for a long distance transmission. However, when an optical fiber according to the present invention is used in such an optical transmission path, flexible design for a dispersion compensated optical fiber is possible because it is possible to alleviate a requirement for PMD in the dispersion compensated optical fiber due to that PMD in an optical fiber according to the present invention is small. Also, it is possible to decrease PMD in an entire optical transmission path by a conventional PMD in a dispersion compensated optical fiber.

Embodiments are described below.

EMBODIMENT 1

An optical fiber having a refractive index profile shown in FIG. 1B in which a germanium is doped into a core is produced (prototype 1). Also, an optical fiber having a refractive index profile shown in FIG. 1B in which a core is an approximately pure silica glass member and a fluorine is doped into a cladding is produced (prototype 2). PND in these optical fibers are compared. The prototype 1 is a silica glass member and the prototype 1 contains approximately 2.7 wt % of germanium in a core and does not contain impurities intentionally except only a small amount of chlorine for removing moisture. Also, the prototype 2 is a silica glass member and the prototype 2 contains approximately 1.1 wt % of fluorine in a cladding and does not contain impurities intentionally except only a small amount of chlorine for removing moisture. In both of optical fibers, the relative refractive index is 0.33% in a core and a cladding.

In the prototype 1, PMD is approximately 0.065 ps/km$^{0.5}$. In the prototype 2, PMD is approximately 0.012 ps/km$^{0.5}$. PMD can be reduced to 0.004 ps/km$^{0.5}$ in an optical fiber by a spin drawn fiber of the prototype 2. As to prototype 2, it is estimated that a difference of thermal expansion coefficient between in a cladding and in a core, α1−α2, would be −0.8×10$^{-7}$/° C. (3.3×10$^{-7}$/° C. in the prototype 1). It is observed that the rest of the optical characteristics in the prototype 2 are almost the same as the optical characteristics in the prototype 1.

EMBODIMENT 2

An optical fiber having a refractive index profile shown in FIG. 1B in which 2.2 wt % of fluorine is doped into a cladding is produced (prototype 3). The prototype 3 is a silica glass member and the prototype 3 does not contain impurities intentionally except only a small amount of chlorine for removing moisture.

In the prototype 3, the relative refractive index in the core and the cladding is 0.69%. In the prototype 3, PMD is approximately 0.026 ps/km$^{0.5}$. PMD can be reduced to 0.010 ps/km$^{0.5}$ in an optical fiber formed by a spin drawn fiber. Under such a condition, it is estimated that a difference of thermal expansion coefficients between in a cladding and in a core, α1−α2, would be −1.7×10$^{-7}$/° C.

EMBODIMENT 3

An optical fiber having a refractive index profile shown in FIG. 1B is produced by doping approximately 0.9 wt % of fluorine to the cladding and doping approximately 0.4 wt % of germanium (prototype 4).

The relative refractive index in the core and the cladding is 0.33%. PMD is approximately 0.009 ps/km$^{0.5}$. PMD can be reduced to 0.006 ps/km$^{0.5}$ in an optical fiber formed by a span drawn fiber. Also, there was no problem in optical characteristics and anti-hydrogen characteristics.

EMBODIMENT 4

An optical fiber having a refractive index profile shown in FIG. 1B is produced by doping approximately 1.1 wt % of fluorine to the cladding and doping approximately 0.4 wt % of germanium and approximately 0.14 wt % of fluorine (prototype 5).

The relative refractive index in the core and the cladding is 0.34%. PMD is approximately 0.015 ps/km$^{0.5}$. PMD can be reduced to 0.006 ps/km$^{0.5}$ in an optical fiber formed by a spin drawn fiber.

EMBODIMENT 5

An optical fiber having a refractive index profile shown in FIG. 1B is produced by doping approximately 1.3 wt % of fluorine and approximately 0.4 wt % of germanium to the cladding and doping approximately 0.4 wt % of germanium and approximately 0.2 wt % of fluorine (prototype 6).

The relative refractive index in the core and the cladding is 0.33%. PMD is approximately 0.021 ps/km$^{0.5}$. PMD can be reduced to 0.008 ps/km$^{0.5}$ in an optical fiber formed by a spin drawn fiber.

EMBODIMENT 6

An optical fiber having a refractive index profile shown in FIG. 2B is produced by doping approximately 1.0 wt % of fluorine and approximately 0.4 wt % of germanium on an outer cladding 2*b* and doping approximately 1.2 wt % of fluorine and approximately 0.4 wt % of germanium to an inner cladding 2*a* and doping approximately 0.4 wt % of germanium and approximately 0.2 wt % of fluorine to the core (prototype 7).

The relative refractive index in the core and the outer cladding is 0.25%. PMD is approximately 0.011 ps/km$^{0.5}$. PMD can be reduced to 0.005 ps/km$^{0.5}$ in an optical fiber formed by a spin drawn fiber.

EMBODIMENT 7

An optical fiber having a refractive index profile shown in FIG. 4B is produced by doping approximately 1.4 wt % of fluorine and approximately 0.8 wt % of germanium on an outer cladding 2b and doping approximately 2.0 wt % of fluorine and approximately 0.8 wt % of germanium to an inner cladding 2a and doping approximately 0.8 wt % of germanium and approximately 0.7 wt % of fluorine to the ring core 1c and doping approximately 1.4 wt % of fluorine on the ring groove 1b and doping approximately 1.2 wt % of germanium to the central core 1a (prototype 8).

The relative refractive index between the central core and the outer cladding is 0.50%. PMD is approximately 0.027 ps/km$^{0.5}$. PMD can be reduced to 0.009 ps/km$^{0.5}$ in an optical fiber formed by a spin drawn fiber.

EMBODIMENT 8

An optical fiber having a refractive index profile shown in FIG. 5B is produced by doping approximately 1.6 wt % of fluorine and approximately 0.8 wt % of germanium on an outer cladding 2b and doping approximately 1.8 wt % of fluorine and approximately 0.8 wt % of germanium to an inner cladding 2a and doping approximately 0.8 wt % of germanium and approximately 0.7 wt % of fluorine to the outer ring core 1d and doping approximately 1.4 wt % of fluorine on the ring groove 1c and doping approximately 1.3 wt % of germanium to the inner ring core 1b and by doping an approximately 1.2 wt % of fluorine to the central groove 1a (prototype 9).

The relative refractive index between the inner ring core and the outer cladding is 0.53%. PMD is approximately 0.026 ps/km$^{0.5}$. PMD can be reduced to 0.009 ps/km$^{0.5}$ in an optical fiber formed by a spin drawn fiber.

Comparison Example 1

An optical fiber having a refractive index profile shown in FIG. 4B is produced by doping approximately 1.2 wt % of fluorine and approximately 0.7 wt % of germanium on an outer cladding 2b and doping approximately 1.7 wt % of fluorine and approximately 0.7 wt % of germanium to an inner cladding 2a and doping approximately 0.7 wt % of germanium and approximately 0.6 wt % of fluorine to the outer ring core 1c and doping approximately 1.4 wt % of fluorine on the ring groove 1b and doping approximately 1.8 wt % of germanium to the central core 1a (prototype 10).

The relative refractive index between the central core and the outer cladding is 0.50%. PMD is approximately 0.054 ps/km$^{0.5}$.

Comparison Example 2

Figure 3A:
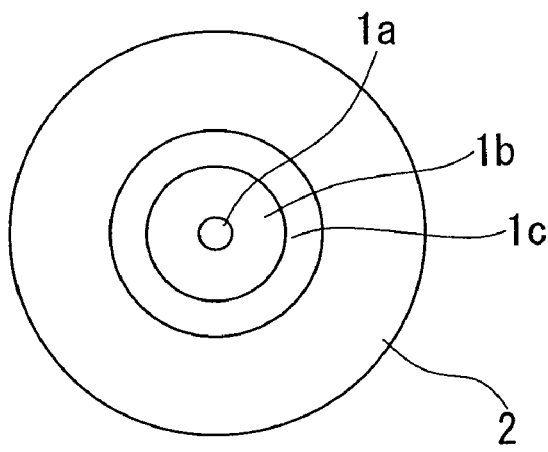
FIG. 3A is a view showing a cross section of an optical fiber in a longitudinal direction.
Figure 3B:
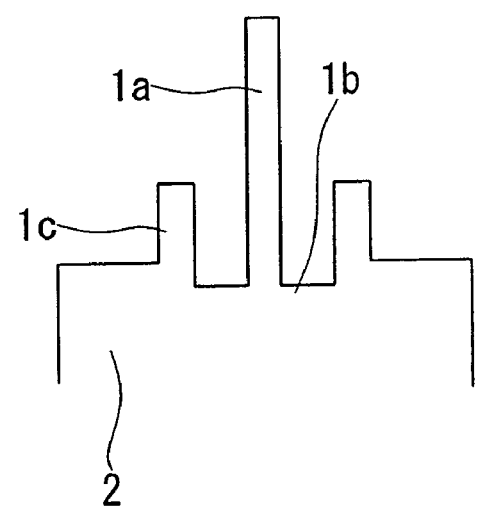
FIG. 3B is an example of a refractive index profile.

An optical fiber having a refractive index profile shown in FIG. 3B is produced by doping approximately 1.1 wt % of fluorine on the cladding 2 and doping approximately 0.4 wt % of germanium and approximately 0.3 wt % of fluorine on the ring core 1c and doping approximately 0.4 wt % of germanium and approximately 1.5 wt % of fluorine to the ring groove 1b and doping approximately 2.4 wt % of germanium and approximately 0.2 wt % of fluorine on the central core 1a (prototype 11).

The relative refractive index between the central core and the outer cladding is 0.60%. PMD is approximately 0.060 ps/km$^{0.5}$.

It is contemplated that numerous modifications may be made to the optical fiber and optical transmission path of the present invention without departing from the spirit and scope of the invention as defined in the following claims.

What is claimed is:

1. An optical fiber which is made mainly from a silica glass having a layer of core and a layer of cladding, wherein:
a formula $-2.5\times10^{-7}/°C. \leq \alpha1-\alpha2 \leq 1.0\times10^{-7}/°C.$ is satisfied; and
a polarization mode dispersion is 0.03 ps/km$^{0.5}$ or lower;
under condition $\alpha1$ is a thermal expansion coefficient of glass which forms the layer of core and $\alpha2$ is a thermal expansion coefficient of glass which forms the layer of cladding.

2. An optical fiber according to claim 1, wherein:
a formula $-1.5\times10^{-7}/°C. \leq \alpha1-\alpha2 \leq 0/°C.$ is satisfied; and
the polarization mode dispersion is 0.015 ps/km$^{0.5}$ or lower.

3. An optical fiber according to claim 1, wherein:
the layer of cladding is a silica glass to which at least a fluorine is doped;
the layer of core is an approximately pure silica glass, or the layer of core is a silica glass doped with a germanium and/or a fluorine; and
a transmission loss at a wavelength of 1550 nm is 0.20 dB/km or lower.

4. An optical fiber according to claim 3, wherein
a maximum concentration of germanium which is doped into the layer of core is 1.5 wt %;
a maximum concentration of fluorine which is doped into the layer of core is also 1.5 wt %.

5. An optical fiber according to claim 3, wherein a germanium together with a fluorine is doped into the layer of cladding.

6. An optical fiber according to claim 5, wherein
a formula $C2-C1 \geq -0.5$ wt % is satisfied,
under condition that C2 is the concentration of germanium in of the layer of cladding and C1 is the concentration of germanium in the layer of core.

7. An optical fiber according to claim 5, wherein
a maximum concentration of germanium which is doped into the layer of core is 1.5 wt %;
a maximum concentration of fluorine which is doped into the layer of core is also 1.5 wt %.

8. An optical fiber according to claim 1, wherein:
an optical fiber preform is twisted and drawn; and
a polarization mode dispersion is 0.01 ps/km$^{05}$ or lower.

9. An optical transmission path formed by combining the optical fiber according to claim 1 as a first optical fiber, and a second optical fiber which compensates for a chromatic dispersion and/or a dispersion slope of the first optical fiber.

10. An optical fiber which is made mainly from a silica glass having a layer of core and two layers of cladding with a refractive index in an outer layer of cladding higher than a refractive index in an internal layer of cladding, wherein;
a formula $-2.5\times10^{-7}/°C. \leq \alpha1-\alpha2 \leq 1.0\times10^{-7}/°C.$ is satisfied; and
a polarization mode dispersion is 0.03 ps/km$^{0.5}$ or lower;
under condition $\alpha1$ is a thermal expansion coefficient of glass which forms the layer of core and $\alpha2$ is a thermal expansion coefficient of glass which forms the layer of cladding having the lowest thermal expansion coefficient of said two layers of cladding.

11. An optical fiber according to claim 10, wherein;
a formula $-1.5 \times 10^{-7}/°C. \leq \alpha1-\alpha2 \leq 0/°C.$ is satisfied; and
a polarization mode dispersion is 0.015 ps/km$^{0.5}$ or lower;
under condition that $\alpha1$ is the thermal expansion coefficient of glass which forms the layer of core and $\alpha2$ is the thermal expansion coefficient of the cladding layer having the lowest thermal expansion coefficient of said two layers of cladding.

12. An optical fiber according to claim 10, wherein:
at least one of the layers of cladding is a silica glass to which at least a fluorine is doped;
the layer core is an approximately pure silica glass, or the layer of core is a silica glass doped with a germanium and/or a fluorine; and
a transmission loss at a wavelength of 1550 nm is 0.22 dB/km or lower.

13. An optical fiber according to claim 12, wherein
a maximum concentration of germanium which is doped into the layer of core is 1.5 wt %;
a maximum concentration of fluorine which is doped into the layer of core is also 1.5 wt %.

14. An optical fiber according to claim 12, wherein a germanium together with a fluorine is doped into any one of the layer of cladding or all of the layers of cladding.

15. An optical fiber according to claim 14, wherein
a formula $C2-C1 \geq -0.5$ wt % is satisfied,
under condition that C2 is the concentration of germanium in of the layer of cladding having the least amount of germanium of said two layers of cladding and C1 is the concentration of germanium in the layer of the core.

16. An optical fiber according to claim 14, wherein
a maximum concentration of germanium which is doped into the layer of core is 1.5 wt %;
a maximum concentration of fluorine which is doped into the layer of core is also 1.5 wt %.

17. An optical fiber according to claim 10, wherein:
an optical fiber preform is twisted and drawn; and
a polarization mode dispersion is 0.01 ps/km$^{0.5}$ or lower.

18. An optical transmission path formed by combining the optical fiber according to claim 10 as a first optical fiber, and a second optical fiber which compensates for a chromatic dispersion andlor a dispersion slope of the first optical fiber.

19. An optical fiber which is made mainly from a silica glass member having three layers of core and two layers of cladding, with a refractive index in an outer layer of cladding equal to or greater than a refractive index in an internal layer of cladding, and a refractive index in a central layer of core higher than a refractive index in an intermediate layer of core, and a refractive index in the intermediate layer of core lower than a refractive index in an outer layer of core, and a refractive index in the outer layer of core higher than a refractive index of at least the internal layer of cladding of said two layers of cladding, wherein:
a formula $-2.5 \times 10^{-7}/°C. \leq \alpha1-\alpha2 \leq 1.0 \times 10^{-7}/°C.$ is satisfied; and
a polarization mode dispersion is 0.03 ps/km$^{0.5}$ or lower;
under condition that a coefficient of thermal expansion of a glass member which forms the layer of core having the highest coefficient of thermal expansion of said three layers of core is $\alpha1$ and a coefficient of thermal expansion of a glass member which forms the layer of core having the lowest coefficient of thermal expansion of said three layers of core is $\alpha2$.

20. An optical fiber according to claim 19, wherein;
a formula $-1.5 \times 10^{-7}/°C. \leq \alpha1-\alpha2 \leq 0/°C.$ is satisfied; and
a polarization mode dispersion is 0.015 ps/km$^{0.5}$ or lower.

21. An optical fiber according to claim 19, wherein:
at least one of the layers of cladding is a silica glass to which at least a fluorine is doped;
each of said three layers of core consist of an approximately pure silica glass, or a silica glass doped with a germanium and/or a fluorine; and
a transmission loss at a wavelength of 1550 nm is 0.25 dB/km or lower.

22. An optical fiber according to claim 21, wherein
the maximum concentration of germanium which is doped into any of the three layers of core is 1.5 wt %;
the maximum concentration of fluorine which is doped into any of the three layers of core is also 1.5 wt %.

23. An optical fiber according to claim 21, wherein a germanium together with a fluorine is doped into any one of the layers of cladding or all of the layers of cladding.

24. An optical fiber according to claim 23, wherein
a formula $C2-C1 \geq -0.5$ wt % is satisfied,
under condition that C2 is the concentration of germanium in of the layer of cladding having the least amount of germanium of said two layers of cladding and C1 is the concentration of germanium in the layer of the core having the least amount of germanium of said three layers of core.

25. An optical fiber according to claim 23, wherein
the maximum concentration of germanium which is doped into any of the three layers of core is 1.5 wt %;
the maximum concentration of fluorine which is doped into any of the three layers of core is also 1.5 wt %.

26. An optical fiber according to claim 17, wherein:
an optical fiber preform is twisted and drawn; and
a polarization mode dispersion is 0.01 ps/km$^{05}$ or lower.

27. An optical transmission path formed by combining the optical fiber according to claim 17 as a first optical fiber, and a second optical fiber which compensates for a chromatic dispersion and/or a dispersion slope of the first optical fiber.

28. An optical fiber which is made mainly from a silica glass member having four layers of core and two layers of cladding, with a refractive index in an outer layer of cladding equal to or greater than a refractive index in an internal layer of cladding, and a refractive index in a central layer of core lower than a refractive index in an inner-intermediate layer of core, and a refractive index in the inner-intermediate layer of higher than a refractive index in an outer-intermediate layer of core, and a refractive index in the outer-intermediate layer of core lower than a refractive index in an outer layer of core, and a refractive index in the outer layer of core higher than a refractive index in at least the internal layer of cladding of said two layers of cladding, wherein;
a formula $-2.5 \times 10^{-7}/°C. \leq \alpha1-\alpha2 \leq 1.0 \times 10^{-7}/°C.$ is satisfied; and
a polarization mode dispersion is 0.03 ps/km$^{0.5}$ or lower;
under condition that a coefficient of thermal expansion of the glass member which forms the layer of core having the highest coefficient of thermal expansion of said four layers of core is $\alpha1$ and a coefficient of thermal expansion of a glass member which forms the layer of cladding having the lowest coefficient of thermal expansion of said two layers of cladding is $\alpha2$.

29. An optical fiber according to claim 28, wherein;
a formula $-1.5 \times 10^{-7}/°C. \leq \alpha1-\alpha2 \leq 0/°C.$ is satisfied; and
a polarization mode dispersion is 0.015 ps/km$^{05}$ or lower.

30. An optical fiber according to claim 28, wherein:

at least one of the layers of cladding is a silica glass to which at least a fluorine is doped;

each of said four layers of core consists of an approximately pure silica glass, or a silica glass doped with a germanium and/or a fluorine; and a transmission loss at a wavelength of 1550 nm is 0.30 dB/km or lower.

31. An optical fiber according to claim 30, wherein the maximum concentration of germanium which is doped into any of the four layers of core is 1.5 wt %;

the maximum concentration of fluorine which is doped into any of the four layers of core is also 1.5 wt %.

32. An optical fiber according to claim 30, wherein a germanium together with a fluorine is doped into any one of the layers of cladding or all of the layers of cladding.

33. An optical fiber according to claim 32, wherein a formula $C2-C1 \geq 0.5$ wt % is satisfied, under condition that C2 is the concentration of germanium in of the layer of cladding having the least amount of germanium of said two layers of cladding and C1 is the concentrations of germanium in the layer of the core having the least amount of germanium of said four layers of core.

34. An optical fiber according to claim 32, wherein the maximum concentration of germanium which is doped into any of the four layers of core is 1.5 wt %;

the maximum concentration of fluorine which is doped into any of the four layers of core is also 1.5 wt %.

35. An optical fiber according to claim 28, wherein:

an optical fiber preform is twisted and drawn; and a polarization mode dispersion is 0.01 $ps/km^{0.5}$ or lower.

36. An optical transmission path formed by combining the optical fiber according to claim 28 as a first optical fiber, and a second optical fiber which compensates for a chromatic dispersion and/or a dispersion slope of the first optical fiber.

* * * * *